United States Patent
Yan

(10) Patent No.: US 9,541,647 B2
(45) Date of Patent: Jan. 10, 2017

(54) RANGE FINDING DEVICE BACKGROUND OF THE INVENTION

(71) Applicant: Jason Yan, Taipei County (TW)

(72) Inventor: Jason Yan, Taipei County (TW)

(*) Notice: Subject to any disclaimer, the term of this patent is extended or adjusted under 35 U.S.C. 154(b) by 325 days.

(21) Appl. No.: 14/248,287

(22) Filed: Apr. 8, 2014

(65) Prior Publication Data

US 2015/0212200 A1 Jul. 30, 2015

(30) Foreign Application Priority Data

Jan. 27, 2014 (TW) ............... 103102868 A

(51) Int. Cl.
*G01C 3/08* (2006.01)
*G01S 17/88* (2006.01)
*F16H 19/04* (2006.01)

(52) U.S. Cl.
CPC ............... *G01S 17/88* (2013.01); *F16H 19/04* (2013.01)

(58) Field of Classification Search
CPC ................................. G01S 17/88; F16H 19/04
USPC ....................................................... 356/4.01
See application file for complete search history.

(56) References Cited

U.S. PATENT DOCUMENTS

| 4,796,198 A * | 1/1989 | Boultinghouse | G01S 17/06 180/167 |
| 8,097,028 B2 * | 1/2012 | Chen | A61N 5/0601 128/898 |
| 8,390,792 B2 * | 3/2013 | Rung | G01S 7/4817 356/4.01 |
| 2008/0074637 A1 * | 3/2008 | Kumagai | G01C 15/002 356/4.01 |
| 2011/0085153 A1 * | 4/2011 | Rung | G01S 7/4817 356/4.01 |
| 2015/0338207 A1 * | 11/2015 | Olexa | G01B 11/14 33/286 |

* cited by examiner

*Primary Examiner* — Mark Hellner
(74) *Attorney, Agent, or Firm* — Chun-Ming Shih

(57) ABSTRACT

A range finding device includes a transmission module, a linked movement module and a range finding module. The linked movement module is connected to and driven by the transmission module. The transmission module driven by an external driving module enables the linked movement module. The range finding module has one plane which is connected with a plane of the linked movement module and further includes a transmitting portion for transmission of a measurement signal and a receiving portion for reception of the reflected measurement signal, each of which is configured on one side of the range finding module.

7 Claims, 5 Drawing Sheets

RANGE FINDING DEVICE BACKGROUND OF THE INVENTION

BACKGROUND OF THE INVENTION

1. Field of the Invention

The present disclosure presents a range finding device, particularly a range finding device which avoids damage attributed to a signal transmission line wound inside.

2. Description of the Prior Art

The automated robot vacuum cleaner which is technically mature at present has been popularizing in household environment and serving a family automatically.

To clean environment effectively, an existing automated robot vacuum cleaner usually depends on a range finding device (e.g., range finder) to probe spatial arrangement in situ, set up a cleaning route based on detected data, and record the extent cleaned.

As shown in the disclosed patent, US 2010/0030380, a conventional range finding device detects ambient environment with a range finding device for a 360-degree turn, transmitting detected data to a control module in an automated robot vacuum cleaner for data processing through a signal transmission line. However, the transmission quality of a signal in the signal transmission line, which is excessively wound or even fractured when the range finding device frequently rotates to detect environmental conditions, may be adversely affected so that an automated robot vacuum cleaner's operation and service quality are jeopardized.

Accordingly, a range finding device featuring a 360-degree turn for good transmission quality of an internally wound signal transmission line which still keeps robust is a technical issue deserving to be studied by the persons skilled in the art.

SUMMARY OF THE INVENTION

In order to solve the technical issue in a conventional range finding device, the present disclosure provides a range finding device for a 360-degree turn without the problem of a signal transmission line wound excessively.

A range finding device in the present disclosure is able to realize the technical purpose. The range finding device comprises a transmission module, a linked movement module and a range finding module. The linked movement module is connected to and driven by the transmission module. The transmission module is provided to an external driving module for driving the linked movement module. The range finding module which allows one plane to be connected with a plane of the linked movement module further comprises a transmitting portion for transmission of a measurement signal and a receiving portion for reception of the reflected measurement signal, each of which is configured on one side of the range finding module.

A conventional rotary range finding device for inspections of ambient conditions around 360 degrees usually allows a range finding module to revolve over one circle along a single rotation direction, resulting in excessive winding or even fracture of a signal transmission line between the range finding module and an external device. The range finding device in the present disclosure features an external driving module for driving a linked movement module on which a range finding device is installed and restricts the linked movement module within a specific route without the problem of excessive winding or even fracture of a signal transmission line linking a range finding module.

DETAILED DESCRIPTION OF THE PREFERRED EMBODIMENT

The embodiments of the present disclosure are presented hereinafter but not used to restrict the scope of a range finding device in the present disclosure.

Figure 1:
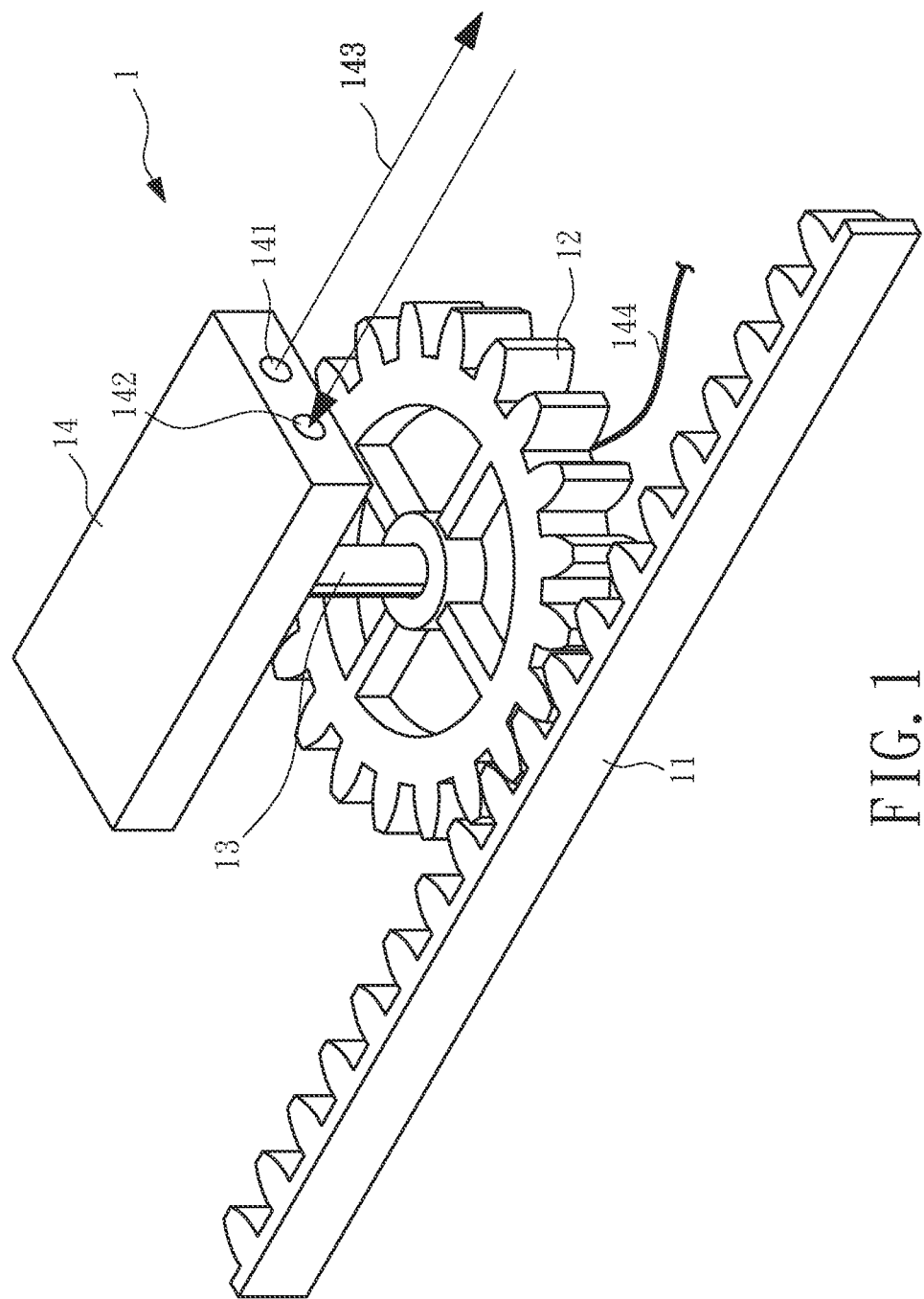
FIG. 1 illustrates a range finding device of the present disclosure in the first embodiment.

Please refer to FIG. 1 which illustrates a range finding device of the present disclosure in the first embodiment. The range finding device 1 comprises a transmission module 11, a linked movement module 12 and a range finding module 14. The linked movement module 12 is connected to and driven by the transmission module 11. The transmission module 11 is provided to an external driving module for driving the linked movement module 12. The range finding module 14 which allows one plane to be connected with a plane of the linked movement module 12 further comprises a transmitting portion 141 and a receiving portion 142. The transmitting portion 141 is configured on one side of the range finding module 14 for transmission of a measurement signal 143; the receiving portion 142 is also configured on one side of the range finding module 14 for reception of the reflected measurement signal 143. The transmission module 11 drives the linked movement module 12 and activates the linked movement module 12 to rotate the range finding module 14 in clockwise or counterclockwise along the axis of the range finding module 14.

The linked movement module 12 is a circular gear; the range finding device 1 further comprises a hollow linkage 13 which links the linked movement module 12 and the range finding module 14. The range finding module 14 further comprises a signal transmission line 144 which is connected with an external control device through the inner of the hollow linkage. The linked movement module 12 can revolve between 360 degrees clockwise and 360 degrees counterclockwise. The measurement signal is either an electromagnetic signal or a sound signal. Both the transmitting portion and the receiving portion are configured on an identical side of the range finding module. The transmission module 11 is a rack.

Figure 2:
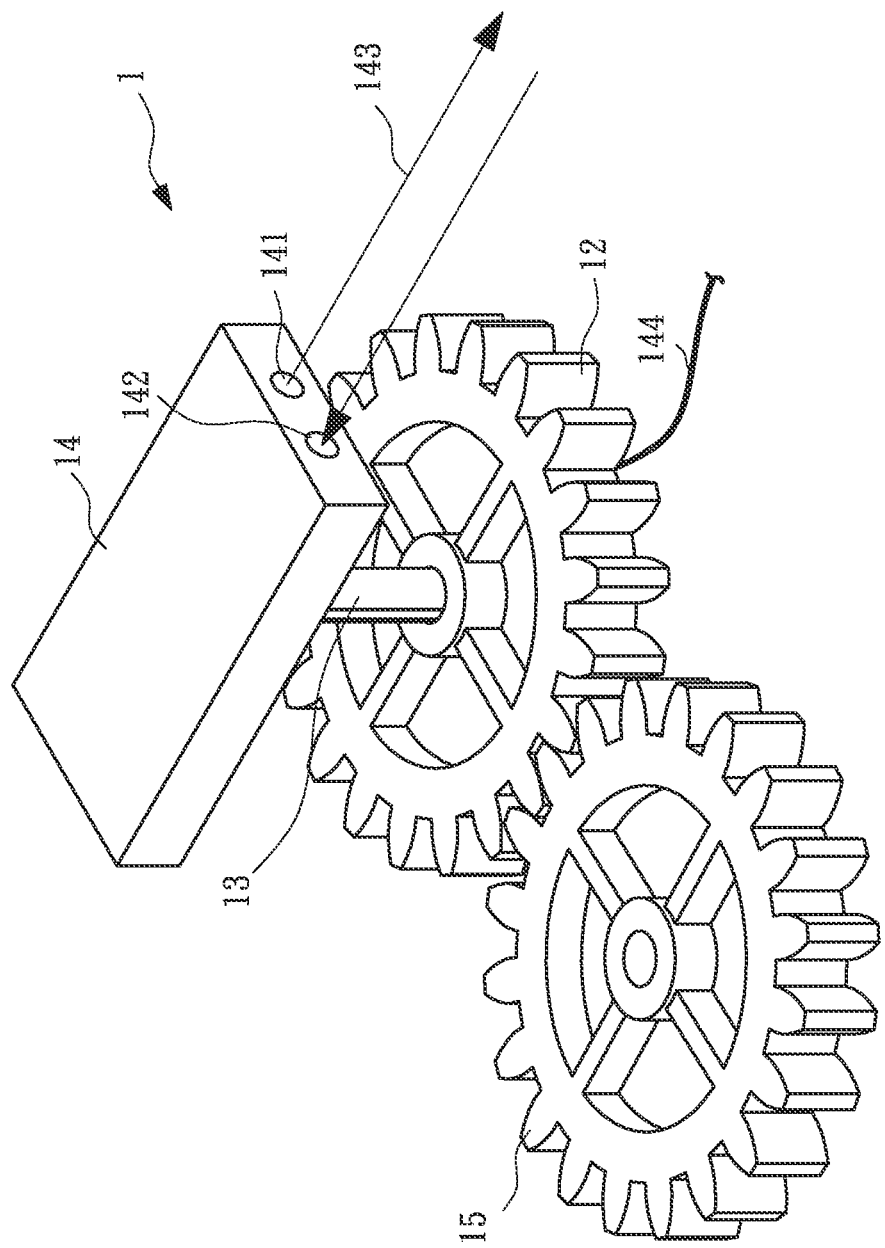
FIG. 2 illustrates a range finding device of the present disclosure in the second embodiment.

Please refer to FIG. 2 which illustrates a range finding device of the present disclosure in the second embodiment. The second embodiment is based on the first embodiment but different from the first one as follows. The transmission module 11 is a transmission gear 150. The driving module is used to drive the transmission gear 150 and further the linked movement module 12.

Figure 3:
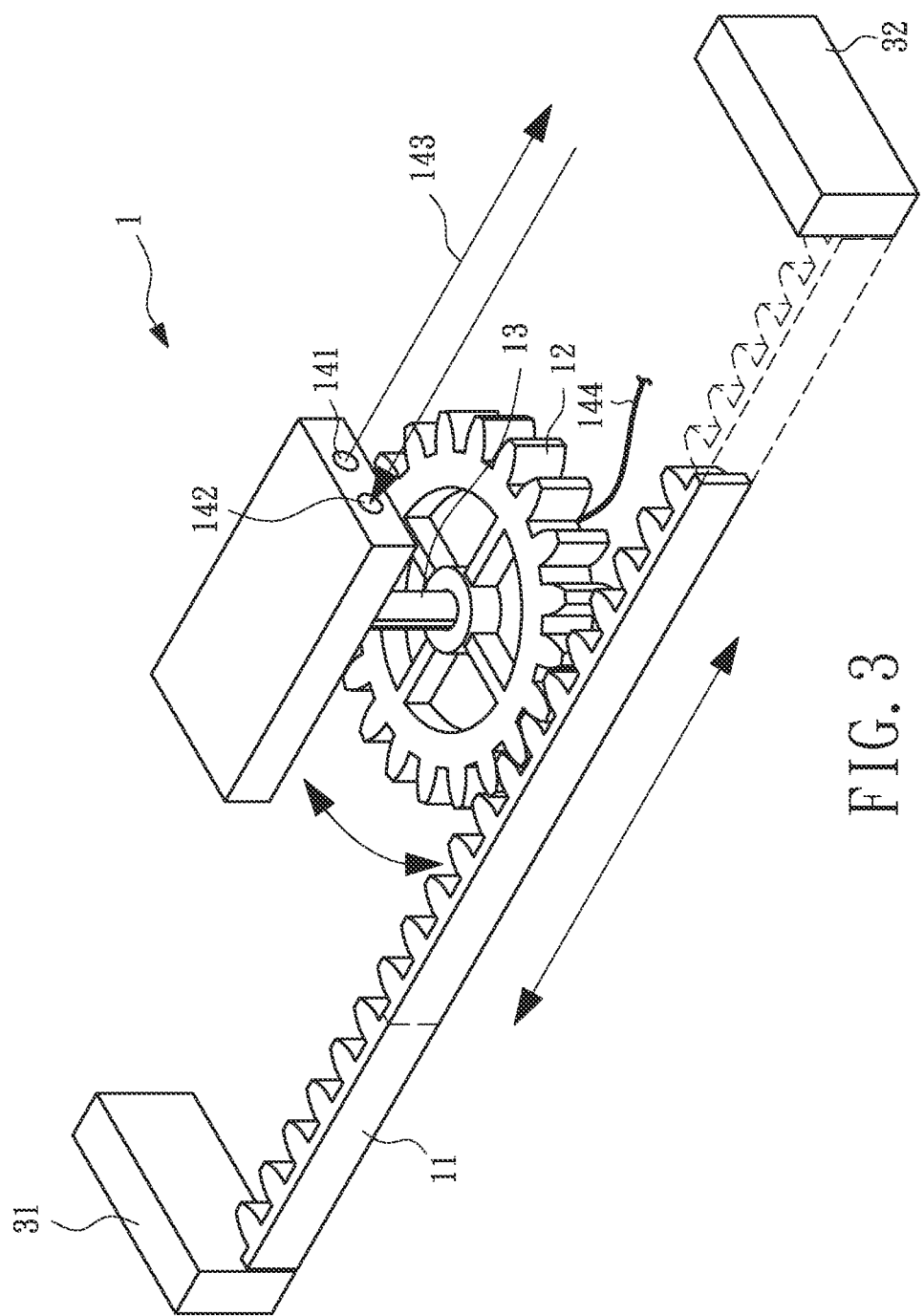
FIG. 3 illustrates a range finding device of the present disclosure for the first application.

Please refer to FIG. 3 which illustrates a range finding device 1 of the present disclosure for the first application. With a detect of ambient environment activated, the range finding device 1 allows an external driving module to drive the transmission module 11 back and forth and further the linked movement module 12 for revolution. The range finding module 14 installed on the linked movement module 12 depends on the transmitting portion 141 (receiving portion 142) to transmit (receive) a measurement signal 143, measuring ambient conditions by analyzing the reflected measurement signal 143 (for example, a phase difference, a time difference or a frequency variation in the measurement signal 143 transmitted and received by the transmitting portion 141 and the receiving portion 142, respectively).

Figure 4:
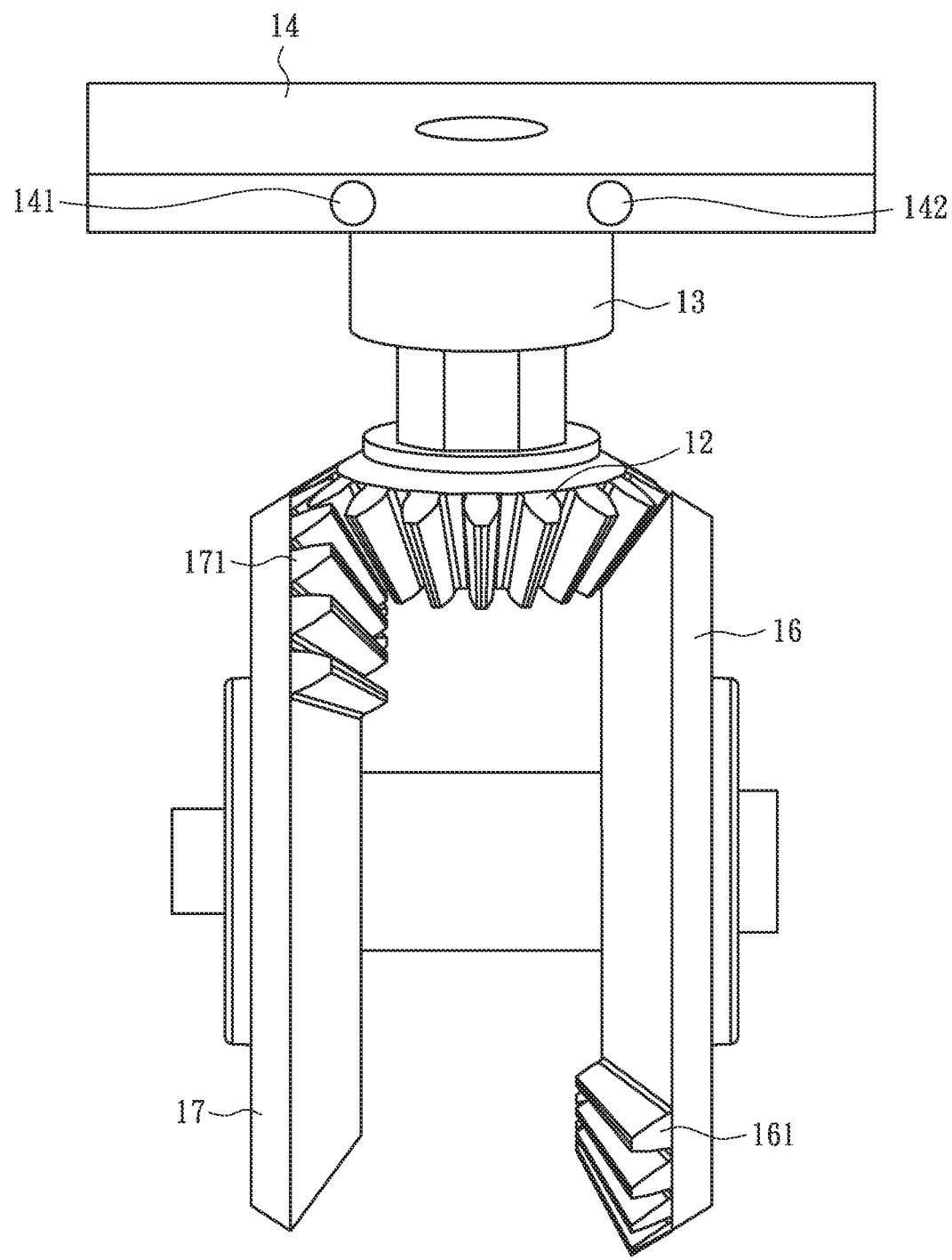
FIG. 4 illustrates a range finding device of the present disclosure in the third embodiment.

Please refer to FIG. 4 which illustrates a range finding device 1 of the present disclosure in the third embodiment. The third embodiment is based on first embodiment but different from the first one as follows: the transmission module 11 in the third embodiment comprises a first transmission gear 16 and a second transmission gear 17. The first transmission gear 16 comprises at least one first teeth portion 161 thereon which further develops a plurality of teeth. The second transmission gear 17 allows one plane to be connected with a plane of the first transmission gear 16 through a driving linkage and comprises at least one second teeth portion 171 thereon which further develops a plurality of teeth. The position which the second teeth portion 171 is situated at the second transmission gear 17 and the other position which the first teeth portion 161 is situated at the first transmission gear 16 are staggered to each other. Both the first transmission gear 16 and the second transmission gear 17 revolve toward a same direction. The linked movement module 12 is a gear, for example, a bevel gear or a circular gear, which engages either the first teeth portion 161 or the second teeth portion 171 for turning the range finding module 14 when the first transmission gear 16 and the second transmission gear 17 revolve toward a same direction.

Figure 5:
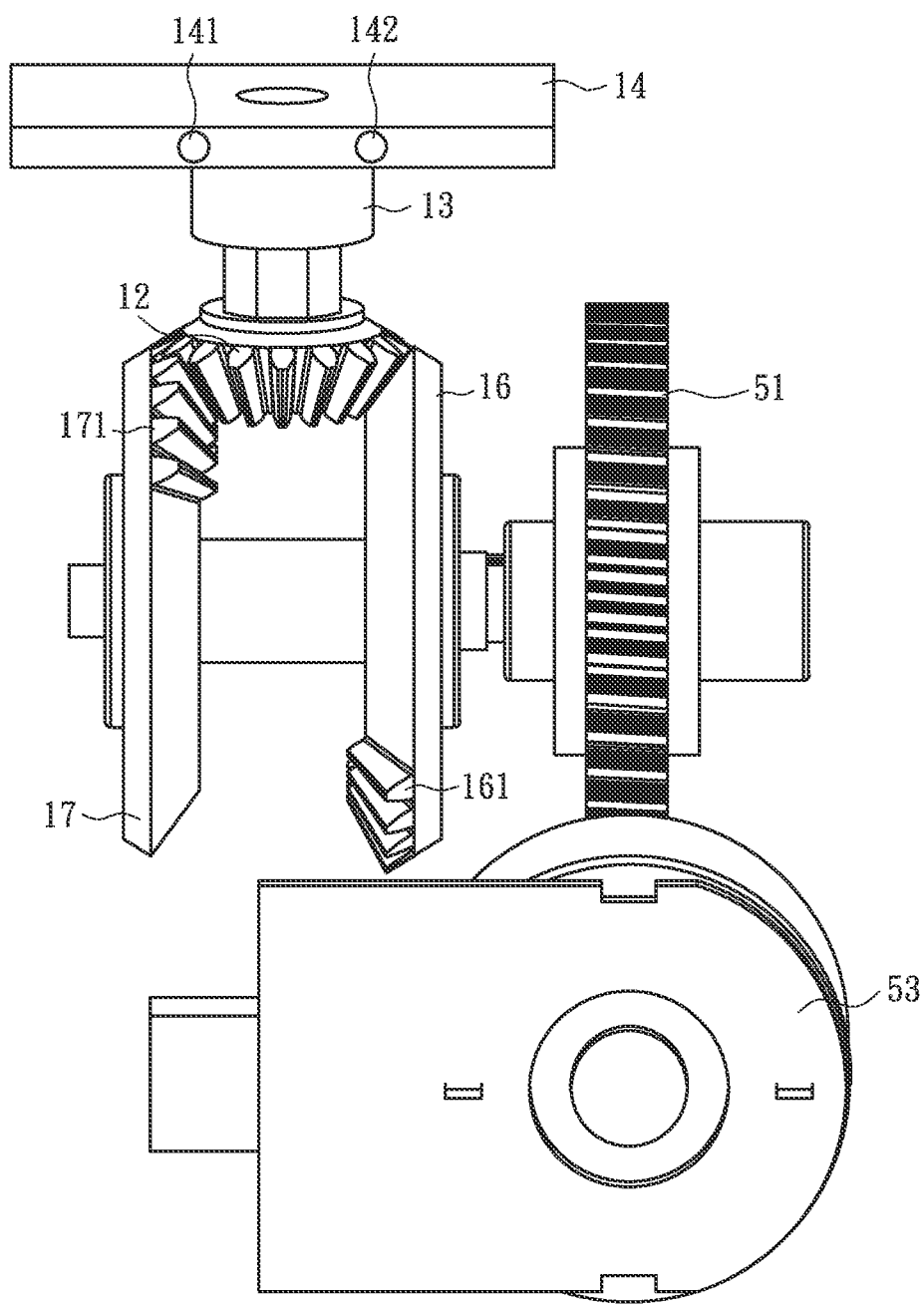
FIG. 5 illustrates a range finding device of the present disclosure for the second application.

Please refer to FIG. 5 which illustrates a range finding device 1 of the present disclosure for the second application. The external driving module is used to match the range finding device 1 as shown in the third embodiment. The external driving module comprises a driving gear 51 and a driving motor 53. The driving motor 53 has an output end engaging the driving gear 51 which links a driving linkage at one plane. Both the first teeth portion 161 and the second teeth portion 171, each of which has a modulus identical to a module of the transmission module 12, are capable of driving the driving gear 51, the first transmission gear 16, the second transmission gear 17 and the linked movement module 12 to revolve the range finding module 14 when the driving motor 53 is activated. The range of revolving the range finding module 14 can be further recognized with a gear ratio of the first teeth portion 161 (or the second teeth portion 171) to the linked movement module 12 decided.

The above descriptions of the present disclosure are examples of feasible embodiments which do not restrict the scope of the present disclosure; any equivalent change or improvement without departing from spirit of the present disclosure should be incorporated in claims herein.

What is claimed is:

1. A range finding device, comprising:
   a transmission module, configured to drive by external driving module, wherein the transmission module further comprises:
      a first transmission gear, one plane of the first transmission gear configuring at least one first teeth portion; and
      a second transmission gear, one plane of the second transmission gear configuring at least one second teeth portion, one plane of the second transmission connecting with the one plane of the first transmission gear by a transmission linkage, each of second teeth portion and each of first teeth portion comprising a plurality of teeth;
      wherein the setting position which the second teeth portion sets on the second transmission gear and the setting position which the first teeth portion sets on the first transmission gear are staggered configured to each other, the first transmission gear and the second transmission having same rotation direction;
      wherein, the linked movement module is a gear, and the linked movement module further gears one of the first teeth portion or one of the second teeth portion;
   a linked movement module, connected to the transmission module, wherein the linked movement module is driven by the transmission module; and
   a range finding module, one plane of the range finding module being connected with a plane of the linked movement module, the range finding module further comprising:
      a transmitting portion, configured on one side of the range finding module, the transmitting portion transmitting a measurement signal;
      a receiving portion, configured on one side of the range finding module, the receiving portion receiving the reflected measurement signal;
      wherein, the transmission module drives the linked movement module and activates the linked movement module to rotate the range finding module in clockwise or counterclockwise along the axis of the range finding module.

2. The device as claimed in claim 1, wherein the linked movement module is gear.

3. The device as claimed in claim 1, wherein the transmitting portion and the receiving portion are configured on the same side of the range finding module.

4. A range finding device, comprising:
   a transmission module, configured to drive by external driving module;
   a linked movement module, connected to the transmission module, the linked movement module being driven by the transmission module;
   a range finding module, one plane of the range finding module being connected with a plane of the linked movement module, the range finding module further comprising:
      a transmitting portion, configured on one side of the range finding module, the transmitting portion transmitting a measurement signal;
      a receiving portion, configured on one side of the range finding module, the receiving portion receiving the reflected measurement signal;
      wherein, the transmission module drives the linked movement module and activates the linked movement module to rotate the range finding module in clockwise or counterclockwise along the axis of the range finding module; and
   a hollow linkage, the hollow linkage being provided to connect with the linked movement module and the range finding module.

5. A range finding device, comprising:
   a transmission module, configured to drive by external driving module;
   a linked movement module, connected to the transmission module, the linked movement module being driven by the transmission module; and a range finding module, one plane of the range finding module being connected with a plane of the linked movement module, the range finding module further comprising:
  a transmitting portion, configured on one side of the range finding module, the transmitting portion transmitting a measurement signal;
  a receiving portion, configured on one side of the range finding module, the receiving portion receiving the reflected measurement signal;
  a signal transmission line connected with an external control device through the inside of a hollow linkage;
  wherein, the transmission module drives the linked movement module and activates the linked movement module to rotate the range finding module in clockwise or counterclockwise along the axis of the range finding module.

6. The device as claimed in claim 1, wherein the driving module is a driving motor, and the driving motor connects to transmission linkage to drive the first transmission gear and the second transmission gear.

7. The device as claimed in claim 1, wherein the driving module further comprises:
  a driving gear, the transmission linkage connecting one plane of the driving gear; and
  a driving motor, geared and drive the driving gear.

* * * * *